No. 754,158. PATENTED MAR. 8, 1904.
J. H. PITKIN.
SPREADING ROLL FOR CORN HUSKERS AND SHREDDERS.
APPLICATION FILED NOV. 20, 1903.
NO MODEL. 2 SHEETS—SHEET 1.

No. 754,158. PATENTED MAR. 8, 1904.
J. H. PITKIN.
SPREADING ROLL FOR CORN HUSKERS AND SHREDDERS.
APPLICATION FILED NOV. 20, 1903.
NO MODEL. 2 SHEETS—SHEET 2.
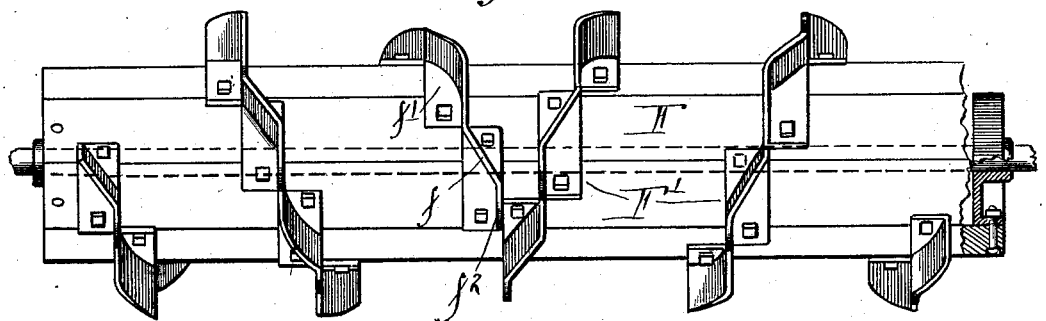
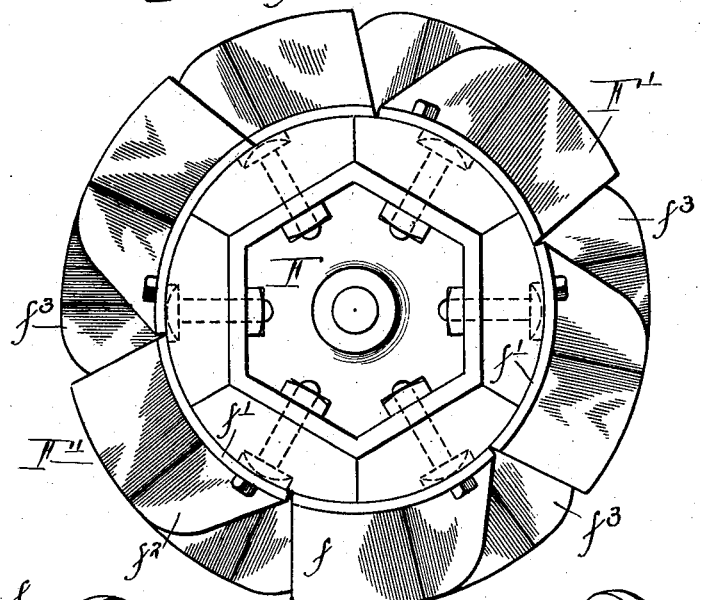
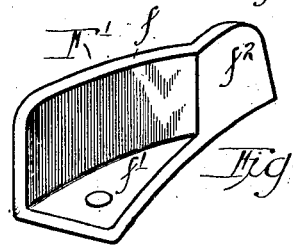

No. 754,158. Patented March 8, 1904.

UNITED STATES PATENT OFFICE.

JULIAN H. PITKIN, OF CHICAGO, ILLINOIS, ASSIGNOR TO INTERNATIONAL HARVESTER COMPANY, OF CHICAGO, ILLINOIS.

SPREADING-ROLL FOR CORN HUSKERS AND SHREDDERS.

SPECIFICATION forming part of Letters Patent No. 754,158, dated March 8, 1904.

Application filed November 20, 1903. Serial No. 181,907. (No model.)

*To all whom it may concern:*

Be it known that I, JULIAN H. PITKIN, a citizen of the United States, residing at Chicago, in the county of Cook and State of Illinois, have invented a certain new and useful Improvement in Spreading-Rolls for Corn Huskers and Shredders, of which the following is a complete specification.

In the ordinary type of spiral spreading-rolls used on shredders it is found that a continuous spiral of uniform pitch will often result in forcing the stalks of corn too far laterally and otherwise irregularly distributing the same. The purpose of this invention is to overcome this difficulty which is accomplished by the use of zigzag-notched spirals instead of uniform spirals, the notches in the spirals enabling the stalks to be released from the grasp of the spiral flanges, and thus insuring a uniform disposition thereof.

Figure 1:
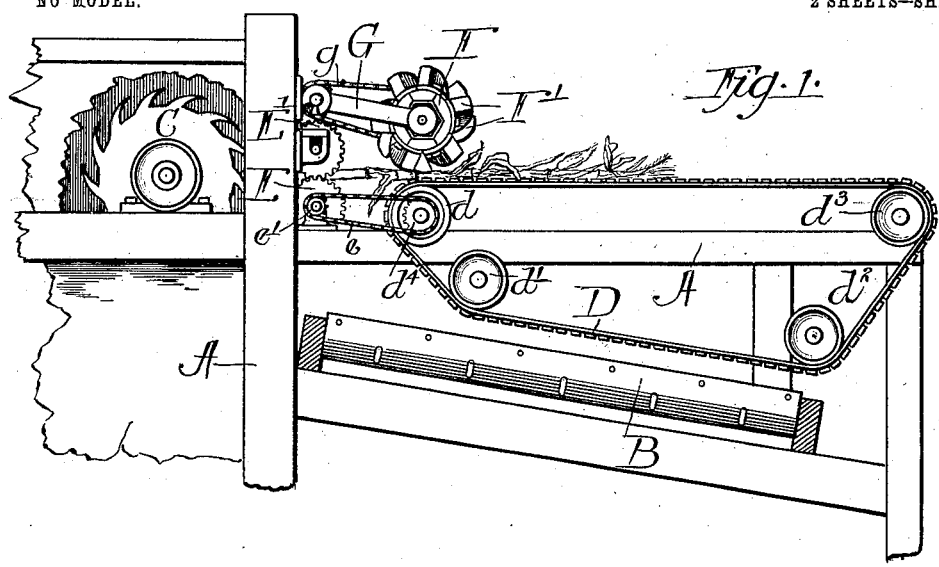
Figure 2:
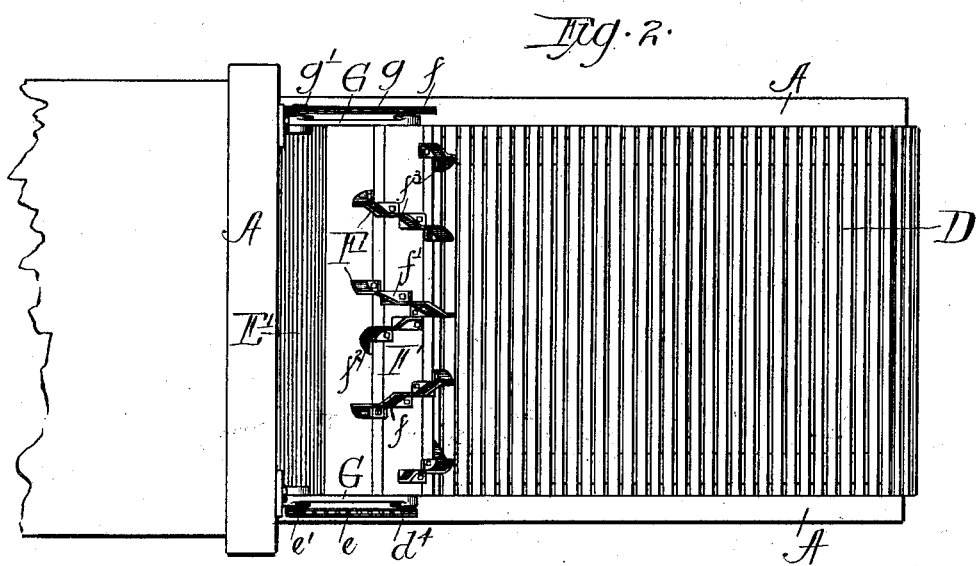

Referring to the drawings, Figure 1 is an elevation of a portion of shredder, illustrating the arrangement of the spreading-roller relative to the adjacent coöperating parts. Fig. 2 is a plan view of that portion represented in Fig. 1. Fig. 3 is a longitudinal view of the improved spreading-roller, and Fig. 4 is an end view of same. Figs. 5 and 6 represent sections forming the right and left hand spirals, respectively.

In the drawings, A designates a portion of the main frame of a shredder; B, the husking-rolls; C, the shredding-head, and D the endless feeding-apron, the lower portion of which lies in a position parallel with and adjacent to the husking-rolls. The endless apron D is mounted upon the rollers $d$, $d'$, $d^2$, and $d^3$ and is driven, preferably, by means of a sprocket-chain $e$, passing over the sprocket-wheels $d^4$ and $e'$ on the roller $d$ and the lower feeding-roll E, respectively.

E' designates the upper feeding-roll, which is yieldingly held in operative relation with respect to the roller E.

F represents the spreading-roll and is of a length corresponding to the width of the feeding-apron G, over the delivery end of which it is located. This spreading-roll F is mounted upon the free ends of two vertically-vibratile arms G. Motion is communicated to the spreading-roll by means of a sprocket-chain $g$, passing around the sprocket-wheel $f$ on the shaft of the spreading-roll F and over a sprocket-wheel $g'$, the axis of which is coincident with the pivotal axis of the vibratile arms G, thus enabling the spreading-roll to receive continuous motion and yet be permitted to rise and fall to accommodate the amount of material passing thereunder.

The foregoing elements, which have been briefly described, are common in different types of shredders, with the exception of the spreading-roll, which is of the specific construction as given, and the only new feature introduced is this special form of spiral (outlined) given to the flange on the spreading-roll.

In Fig. 3 will be seen that the roller F consists of a cylinder with a right and left hand spiral flange starting from the center and extending to either end. The spiral flanges consist of a series of plates or sections F', bolted or otherwise secured to the roll in a spiral form. These plates or sections consist of the flanged portion $f$, extending radially of the roll, and a web portion $f'$, having a curvature corresponding to the surface thereof and to which it is secured. The flange $f$ extends in a direction oblique to the axis of the roll; but a portion, $f^2$, of its length is made to extend transverse to said axis, the result being to provide momentary intervals of time in which no lateral movement will be given to the stalks of corn while under the spreading action of the roll, thus permitting the stalks which lie in the notches between the adjacent sections constituting the spiral to become disengaged and distributed evenly across the feeding-apron. These notches (shown as $f^3$ in Fig. 4) are formed by the receding edge of the flange portions $f$ and $f^2$ of the sections F'.

What I claim as my invention, and desire to secure by Letters Patent, is—

A spreading-roll for corn huskers and shredders comprising a shaft and a series of plates or flanges bolted thereto, each individual plate or flange of the series having a portion of its length lying in a plane perpendicular to said shaft, and a portion lying in a plane oblique to said shaft, with the adjacent ends of the flanges of each individual plate of the series receding from each other, the disposition of this series of plates being made in such a manner as to form oppositely-pitched interrupted spirals about the said shaft, substantially as described.

JULIAN H. PITKIN.

In presence of—
 LEONORA FRIELEY,
 TORRIS H. ALFREDS.